United States Patent [19]

Balsells

[11] Patent Number: 4,678,210
[45] Date of Patent: Jul. 7, 1987

[54] LOADING AND LOCKING MECHANISM

[75] Inventor: Peter J. Balsells, 17592 Sherbrook Dr., Tustin, Calif. 92680

[73] Assignees: Peter J. Balsells; Joan C. Balsells, both of Tustin, Calif.

[21] Appl. No.: 896,722

[22] Filed: Aug. 15, 1986

[51] Int. Cl.$^4$ ............................................. F16L 39/00
[52] U.S. Cl. .................................... 285/318; 285/306
[58] Field of Search ............... 285/318, 305, 321, 306; 403/326, DIG. 7

[56] References Cited

U.S. PATENT DOCUMENTS

| | | | |
|---|---|---|---|
| 2,101,346 | 12/1937 | Robertson . | |
| 2,154,275 | 4/1939 | Linn . | |
| 2,538,683 | 1/1951 | Guiler et al. | 285/321 X |
| 2,797,937 | 7/1957 | Frishof | 285/306 X |
| 2,846,240 | 8/1958 | Beyer | 285/318 X |
| 3,250,331 | 5/1966 | Boyle | 285/321 X |
| 3,359,617 | 12/1967 | Baumler . | |
| 3,377,075 | 4/1968 | Feller . | |
| 3,910,566 | 10/1975 | Pedersen et al. . | |

Primary Examiner—Richard J. Scanlan, Jr.
Attorney, Agent, or Firm—Hackler Walter A.

[57] ABSTRACT

The loading and locking mechanism includes a first cylindrical member with means defining a circumferential groove therein having a first surface of revolution disposed at an angle with the axis of the first cylindrical member. Co-operating with the first cylindrical member is a second cylindrical member having an axial opening sized to accommodate the first cylindrical member and an inside surface groove having a second surface of revolution disposed at an angle with the axis of the second cylindrical member. A continuous ellipsoidal spring having canted coils is disposed in both first and second cylindrical member grooves for forcing the first and second surfaces of revolution away from one another to cause axial loading between the first and second cylindrical members. Additional locking surfaces may be provided each of the first and second grooves which are disposed generally perpendicular to the first and second cylindrical member axis.

14 Claims, 6 Drawing Figures

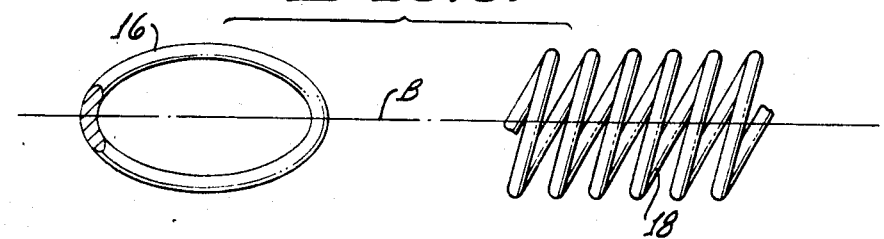
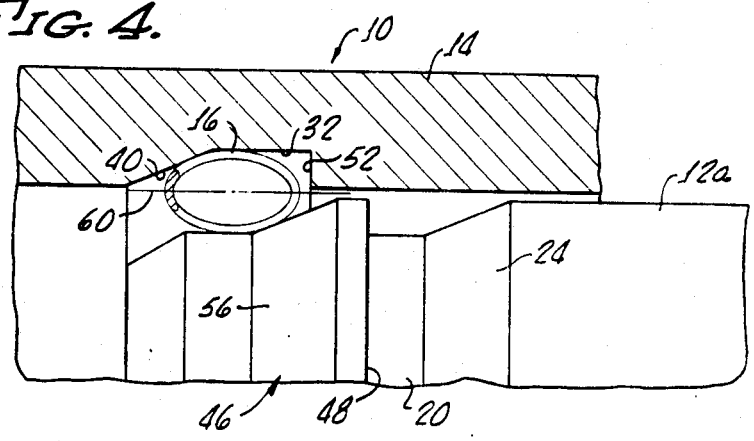
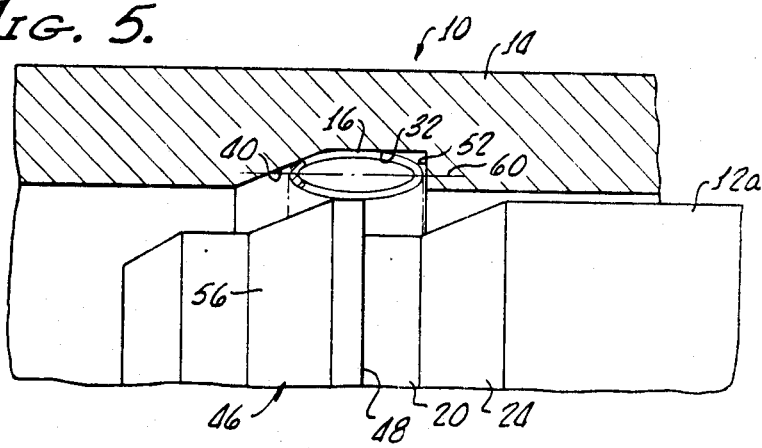
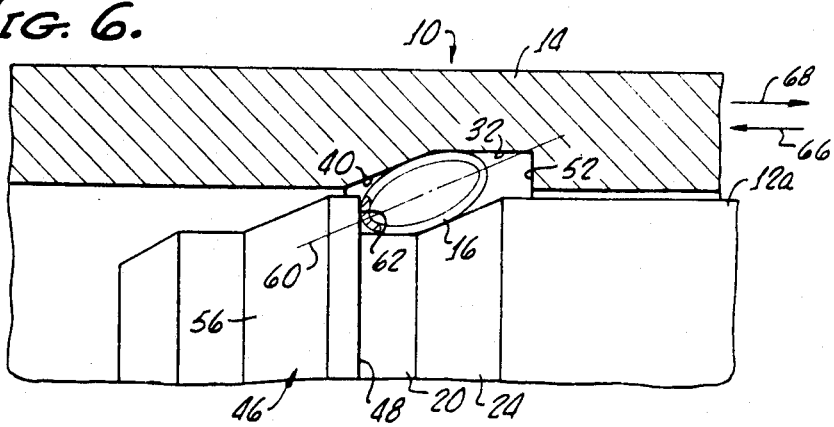

LOADING AND LOCKING MECHANISM

The present invention generally relates to locking mechanisms for cylindrical members and is more particularly directed to mechanisms for both locking and axially loading, or biasing, cylindrical members with one another.

Specifically, the present invention is directed to the engaging and interlocking of lightweight, delicate and many times fragile cylindrical parts with one another. While sizing the embodiment of the present invention to a larger scale may be possible depending upon loading and locking requirements, the present invention is most suited for laboratory type equipment, such as titrators, diluters, syringe pumps and the like, utilized in laboratory chemical analysis, such as in hematology, pathology and biochemical applications.

Many of these devices require the coupling and re-coupling of cylindrical or tubular members therewith, such as pipettes, syringes, etc., which must be quickly connected to and disconnected from the apparatus. In addition, during the coupled position, the members must be held in a preselected position with respect to one another, either to provide a seal or for proper alignment of the members with one another in order to facilitate or enable the operation of the device without the leakage or spillage or other loss of vital fluids being tested.

Heretofore, quick connected couplings between cylindrical members utilized a multitude of components in order to provide both temporary locking of the members together and alignment of the members with one another.

It should be appreciated that laboratory environment for which the present invention is designed is often of the "clean room" type. In addition, mechanisms for locking and loading may be part of a disposable item. In this case, simple construction and a minimum number of parts is important from a cost standpoint.

The mechanism of the present invention provides a device suitable for the hereinabove identified application which includes a minimum number of moving parts that can reliably cooperate with one another to provide efficient locking and loading operation. While other locking devices have generally provided for detent-type latching operations utilizing springs disposed in cylindrical members, these devices do not provide for axial loading between the cylindrical members as provided by the mechanism of the present invention.

SUMMARY OF THE INVENTION

Loading and locking mechanism in accordance with the present invention generally includes a first cylindrical member including means defining a circumferential groove therein, with the circumferential groove including a first surface of revolution disposed at an angle with the axis of the first cylindrical member. Cooperating with the first cylindrical member is a second cylindrical member including means defining an axial opening sized to accommodate the first cylindrical member. The second cylindrical member includes means defining a groove on an inside surface of the second cylindrical member, with the inside surface groove including a second surface of revolution disposed at an angle with the axis of the second cylindrical member.

Spring means disposed in both the first and second cylindrical member grooves is operative for forcing the first and second surfaces of revolution away from one another to cause axial loading between the first and second cylindrical members. Preferably, the first and second surfaces of revolution are approximately parallel with one another and the circumferential groove further includes a third surface of revolution disposed at an angle with the axis of the second cylindrical member and facing the second surface of revolution. The inside surface groove is sized for enabling the first and second cylindrical member to be separated from one another by relative motion thereof, causing either the first or the third surface of revolution to compress the spring means into the inside surface groove, allowing the first cylindrical member to move therepast.

An additional locking means may be provided for preventing separation of the first and second cylindrical member by movement of the first and second surfaces of revolution away from one another. The locking means may comprise a first locking surface in the circumferential groove which is disposed in a plane approximately perpendicular to the axis of the first cylindrical member and a seond locking surface in the inside surface groove disposed in a plane approximately perpendicular to the axis of the second cylindrical member.

Preferably, the spring means comprises a continuos ellipsoidal coil spring which includes a plurality of elliptically-shaped coils disposed in a canted relationship with an axis of the continuous ellipsoidal coil spring.

In this position, the ellipsoidal coil spring may be disposed in the circumferential groove and the inside surface groove with a major axis of the elliptically-shaped coils approximately parallel to the first and second surfaces of revolution.

In addition, the first locking surface may engage the ellipsoidal coil spring at a point thereon between the elliptically-shaped coils' major axis and the second surface of revolution. The second locking surface has a height measured from the bottom of the first groove, which is greater than a radial height of the ellipsoidal coil spring, when the ellipsoidal coil spring is radially compressed to its elastic limit, to enable separation of the first and second cylindrical member from one another when moved with respect to one another in a first direction. This occurs when the first surface of revolution radially compresses the ellipsoidal coil spring into the inside surface groove.

The first and second locking surfaces also prevent separation of the first and second cylindrical members by compressing the ellipsoidal coil spring in an axial direction to increase the radial force of the ellipsoidal spring between the cylindrical members, and greater engagement force between the first and second cylindrical members.

To facilitate assembly of the mechanism, ramp means may be provided on the first cylindrical member for compressing the ellipsoidal spring as a second cylindrical member is pushed into the first cylindrical member axial opening.

BRIEF DESCRIPTION OF THE DRAWINGS

A better understanding of the present invention may be had from the consideration of the following detailed description, taken in conjunction with the accompanying drawings, in which:

FIG. 3 is a view of an ellipsoidal spring showing individual coils slanted, or canted, with an axis of the spring;

FIG. 4 is an alternative embodiment of the present invention showing mechanism for enhanced locking;

FIG. 5 is a cross-sectional view of the present invention in an intermediate position in which a ramp forces the ellipsoidal spring into a second groove disposed in a second cylindrical member; and, FIG. 6 is a cross-sectional view of the mechanism of the present invention showing in greater detail the ellipsoidal spring disposed in the circumferential groove and the inside surface groove in engaging with a first and second loading surface to cause axial loading between the first and second cylindrical members.

DETAILED DESCRIPTION

Figure 1:
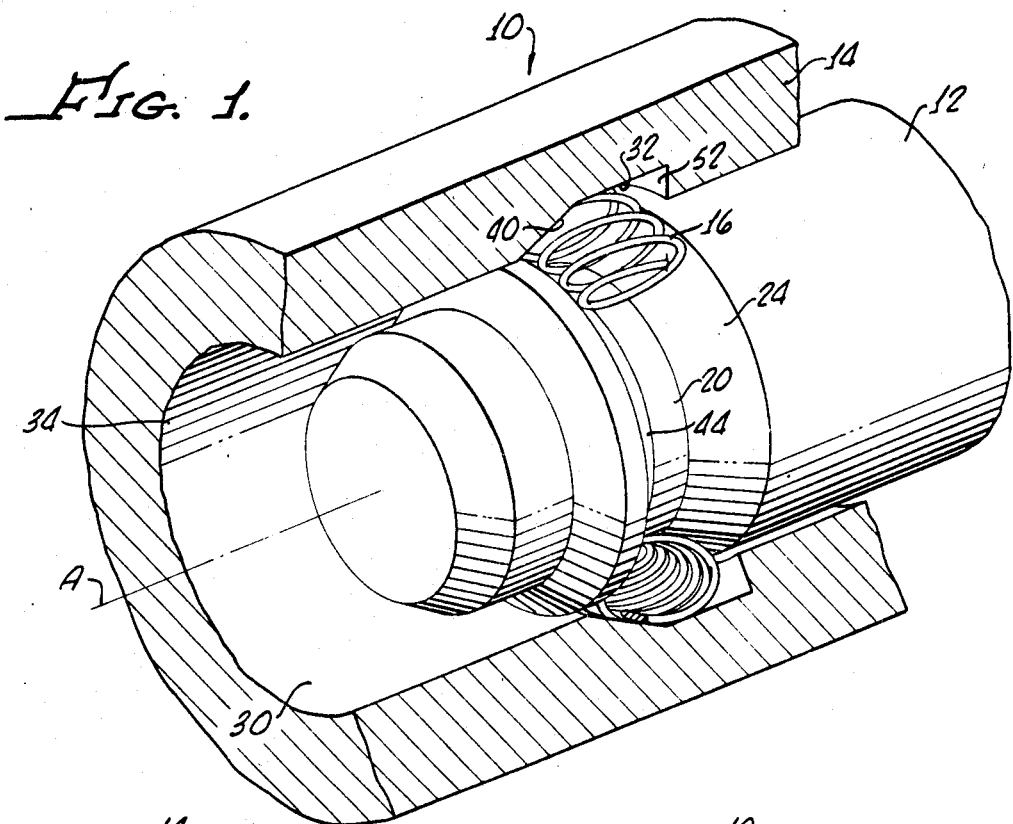
FIG. 1 is a perspective view of the present invention partially broken away showing a first and a second cylindrical member engaged with one another, with axial loading therebetween provided by a torroidal spring disposed in a groove formed in each of the first and second cylindrical members.
Figure 2:
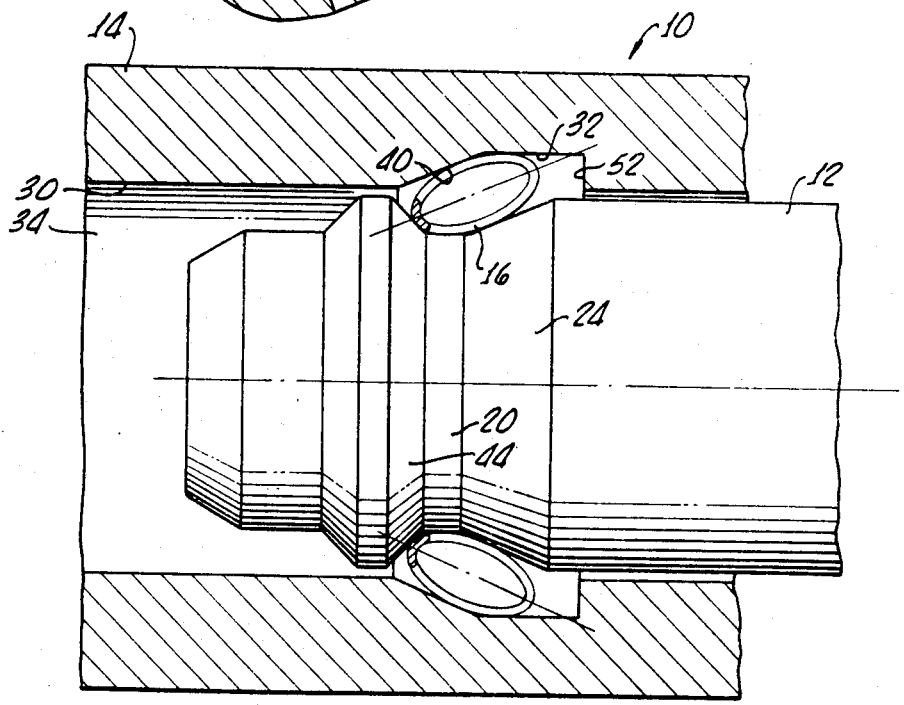
FIG. 2 is a cross-sectional view of the locking and loading mechanism in accordance wth the present invention showing the first and second cylindrical member in an operational position.

Turning now to FIGS. 1 and 2 there is shown a loading and locking mechanism 10 in accordance with the present invention including a first cylindrical member 12, a second cylindrical member 14 and an ellipsoidal spring 16. It should be appreciated that the drawings herein presented are not to scale, and that the diameters of the first and second cylindrical members 12, 14, as well as the wall thickness of the second cylindrical member, may be fractions of an inch. The material of construction for the mechanism may be of lightweight material suitable for a laboratory environment, such as glass, Teflon, and the like.

The first cylindrical member 12 includes a circumferential groove 20 which includes a first surface of revolution, or loading surface, 24, which is disposed at an angle with the axis A of the first and the second cylindrical members 12, 14. An axial opening 30 in the second cylindrical member 14 is sized to accommodate the first cylindrical member 12 and includes a groove 32 on an inside surface 34, with the inside surface groove 32 including a second surface of revolution 40 disposed at an angle with the axis A.

Axial loading, or biasing, of the first and second cylindrical members 12, 14 is produced by the spring 16 forcing the first and second surfaces of revolution 24, 40 in directions away from each other. In this manner, the first and second cylindrical members can be aligned within equipment (not shown) and otherwise provide a force for sealing the members to one another, or other members (not shown), through the use of conventional sealing arrangements (not shown).

The ellipsoidal spring 16 may be constructed in accordance with specifications set forth in U.S. patent application Ser. No. 689,451, filed Jan. 7, 1985, which is incorporated herewith by specific reference thereto. In order to provide a constant loading between the cylindrical members, the spring 16 may include a plurality of coils 18 disposed in a canted relationship with an axis B of the spring as described in the aforementioned patent application and shown in FIG. 3.

As shown in FIG. 1, a third surface of revolution 44 may be provided in the first cylindrical member 12 which is disposed with an angle with the axis A and facing the surface of revolution 24. In this arrangement, the members 12, 14 may be separated from one another by axial movement, overcoming the force of the spring 16, with either the first or third surface of revolution compressing the spring 16 into the inside groove 32.

Where more positive locking is desired in one direction, the first cylindrical member 12a in accordance with a second embodiment of the present invention may include a shoulder 46, (FIG. 4) having a first locking surface 48 disposed in a plane approximately perpendicular to the axis of the member 12a and the second cylindrical member may include a second locking surface 52 disposed approximately perpendicular to the axis A.

Preferably, the first and second surfaces of revolution 24, 40 are disposed approximately parallel with one another, and where radial indexing of the first and second cylindrical members 12a, 14 is not necessary, the members 12a and 14 may be cylindrical in cross-section, as shown in the Figures.

To facilitate assembly of the mechanism, the shoulder 46 may include a ramp 56 for compressing the ellipsoidal spring 16 into the groove 32, as shown in FIGS. 4, 5 and 6 in step-wise fashion.

When assembled in a cooperating position for locking and loading, as shown in FIG. 6, the elliptically-shaped coil 16 is disposed in part in both of the grooves 20, 32, with a major axis 60 approximately parallel to the first and second surfaces of revolution 24, 40.

Importantly, to enhance the locking characteristics of the present invention, the first locking surface 48 engages elliptically-shaped coil spring at a point 62, which is between the elliptically-shaped coil major axis 60 and the second surface of revolution 40. (See FIG. 6).

As can be seen in FIG. 6, if the first cylindrical member 12 is held stationary and the second cylindrical member is moved in a direction indicated by the arrow 66, the first and second locking surfaces 48, 52 will close and compress the ellipsoidal spring 16 in an axial direction which increases the radial force of the ellipsoidal spring, providing greater engagement force with the first and second cylindrical members to thereby enhance the locking characteristic of the mechanism. As hereinbefore pointed out, the point 62 of engagement of the first locking surface 48 with the spring 12 is above the axis 60 of the spring, thereby preventing the spring from moving over the first locking surface.

On the other hand, uncoupling of the members is accomplished by holding the first cylindrical member 12 in a stationary position and moving the second cylindrical member in a direction of the arrow 68, thus causing the loading surfaces 24, 40 to compress the spring into the groove 20 and allow the cylindrical members 12a, 14 to pass one another for separation.

It should be appreciated that the height of the second locking surface, or depth of the second groove 32, is greater than the radial height of the ellipsoidal coil spring 16, when the spring is compressed to its elastic limit to enable separation of the first and second cylindrical members 12a, 14 from one another as the first surface of revolution radially compresses the spring into the inside surface groove 32.

Although there has been described hereinabove a specific loading and locking mechanism in accordance with the present invention for the purpose of illustrating the manner in which the invention may be used to advantage, it should be appreciated that the invention is not limited thereto. Accordingly, any and all modifications, variations, or equivalent arrangements, which may occur to those skilled in the art, should be considered to be within the scope of the invention as defined in the appended claims.

What is claimed is:

1. Loading and locking mechanism comprising:
   a first cylindrical member including means defining a circumferential groove therein, said circumferential groove including a first surface of revolution disposed at an angle with the axis of said first cylindrical member;
   a second cylindrical member including means defining an axial opening sized to accommodate said first cylindrical member, said second cylindrical member including means defining a groove in an inside surface of said second cylindrical member, the inside surface groove including a second surface of revolution disposed at an angle with the axis of said second cylindrical member;
   spring means disposed in both the first and second cylindrical member grooves for forcing said first and second surfaces of revolution away from one another to cause an axial loading between the first and second cylindrical member; and,
   locking means for preventing separation of the first and second cylindrical member by movement of the first and second surfaces of revolution away from one another, said locking means comprising a first locking surface in said circumferential groove disposed in a plane approximately perpendicular to the axis of the first cylindrical member and a second locking surface in the inside surface groove disposed in a plane approximately perpendicular to the axis of the second cylindrical member.

2. The loading and locking mechanism according to claim 1 wherein the inside surface groove is sized for enabling said first and second cylindrical member 2 to be separated from one another by movement of the first and second surfaces of revolution toward one another causing said first surface of revolution to compress the spring means into the inside surface groove allowing the first cylindrical member to move therepast and be separated therefrom.

3. Loading and locking mechanism comprising:
   a first cylindrical member including means defining a circumferential groove having a shoulder and a first loading surface, said shoulder comprising a first locking surface disposed in a plane approximately perpendicular to the axis of the first cylindrical member, said first loading surface comprising a first surface of revolution disposed at an angle to the first cylindrical member axis;
   a second cylindrical member including means defining an axial opening therein sized to accommodate said first cylindrical member, said second cylindrical member including means defining a groove in an inside surface of said second cylindrical member, the inside surface groove having a second locking surface disposed in a plane approximately perpendicular to the axis of the second cylindrical member, and a second loading surface comprising a second surface of revolution disposed at an angle to the second cylindrical member axis; and,
   spring means disposed in both the circumferential groove and the inside surface groove for forcing said first and second loading surface away from one another to cause an axial loading between the first and second cylindrical members, said first and second locking surfaces preventing the axially loaded first and second cylindrical members from separating from one another by engaging said spring means.

4. The loading and locking mechanism according to claim 3 wherein the first and second surface of revolution are approximately parallel with one another.

5. The loading and locking mechanism according to claim 4 wherein said spring means comprises a continuous ellipsoidal coil spring.

6. The loading and locking mechanism according to claim 5 wherein said continuous ellipsoidal coil spring comprises a plurality of elliptically shaped coils.

7. The loading and locking mechanism according to claim 6 wherein said plurality of elliptically shaped coils are disposed in a canted relationship with an axis of the continuous ellipsoidal torroidal shaped coil spring.

8. The loading and locking mechanism according to claim 7 wherein both the first and second cylindrical members have a circular cross-section.

9. The loading and locking mechanism according to claim 8 wherein the elliptically shaped coil spring is disposed in the circumferential groove and the inside surface groove with a major axis of the elliptically shaped coils approximately parallel to the first and second surfaces of revolution.

10. The loading and locking mechanism according to claim 9 wherein said first locking surface engages said elliptically spherically-shaped coil spring at a point thereon between the elliptically-shaped coils' major axis and the second surface of revolution.

11. The loading and locking mechanism according to claim 10 wherein said first shoulder further comprises ramp means for enabling assembly of the mechanism, said ramp means compressing said ellipsoidal spring as the first cylindrical member is pushed into the second cylindrical member axial opening.

12. The loading and locking mechanism according to claim 11 wherein said first shoulder ramp means comprises a third surface of revolution disposed at an angle to the second cylindrical member axis and generally parallel to the first and second surfaces of revolution.

13. The loading and locking mechanism according to claim 12 wherein said second locking surface has a height, measured from a bottom of the inside surface groove, greater than a radial height of the ellipsoidal coil spring when said ellipsoidal coil spring is radially compressed to its elastic limit, to enable separation of the first and second cylindrical member from one another when moved with respect to one another in a first direction causing the first surface of revolution to radially compress the ellipsoidal coil spring into said inside surface groove.

14. The loading and locking mechanism according to claim 13 wherein the first and second locking surfaces prevent separation of the first and second cylindrical members by compressing the ellipsoidal coil spring in an axial direction to increase the radial force of the ellipsoidal spring between the cylindrical member when the cylindrical members are moved with respect to one another in a second direction, said second direction being opposite said first direction, said increased radial force of the ellipsoidal spring enabling greater engagement force between said first and second cylindrical members.

* * * * *